United States Patent
Guerin

(10) Patent No.: US 9,341,205 B2
(45) Date of Patent: May 17, 2016

(54) FAMILY OF FIXATION DEVICES WITH VARIABLE TAPER

(75) Inventor: Nicolas Guerin, Mery sur Oise (FR)

(73) Assignee: LISI AEROSPACE, Saint Ouen l'Aumone (FR)

( * ) Notice: Subject to any disclaimer, the term of this patent is extended or adjusted under 35 U.S.C. 154(b) by 626 days.

(21) Appl. No.: 13/377,822

(22) PCT Filed: Jun. 8, 2010

(86) PCT No.: PCT/FR2010/051126
§ 371 (c)(1),
(2), (4) Date: May 18, 2012

(87) PCT Pub. No.: WO2010/142901
PCT Pub. Date: Dec. 16, 2010

(65) Prior Publication Data
US 2012/0237289 A1    Sep. 20, 2012

(30) Foreign Application Priority Data
Jun. 13, 2009    (FR) ...................................... 09 53959

(51) Int. Cl.
*F16B 5/02*    (2006.01)
(52) U.S. Cl.
CPC . *F16B 5/02* (2013.01); *Y10T 403/62* (2015.01)
(58) Field of Classification Search
CPC ............ F16B 5/00; F16B 5/02; F16B 5/0258; F16B 4/004; F16B 13/06
USPC ................. 403/408.1, 334, 337, 282; 29/525, 29/522.1, 523; 411/378, 44, 367
See application file for complete search history.

(56) References Cited

U.S. PATENT DOCUMENTS

| | | | | |
|---|---|---|---|---|
| 1,767,019 | A * | 6/1930 | Sergeeff | 411/57.1 |
| 1,823,428 | A * | 9/1931 | Hill | 411/80.1 |
| 3,270,410 | A | 9/1966 | Salter et al. | |
| 3,271,058 | A * | 9/1966 | Anderson | 403/408.1 |
| 3,298,725 | A * | 1/1967 | Boteler | 403/282 |
| 3,603,626 | A * | 9/1971 | Whiteside | 403/408.1 |
| 3,641,865 | A * | 2/1972 | Swindt et al. | 411/361 |
| 3,821,871 | A * | 7/1974 | Schmitt | 403/408.1 |
| 4,048,898 | A | 9/1977 | Salter | |
| 4,087,896 | A * | 5/1978 | Salter | 29/256 |
| 4,102,036 | A * | 7/1978 | Salter | 29/525 |
| 4,702,658 | A | 10/1987 | Salter | |
| 4,974,989 | A * | 12/1990 | Salter | 403/408.1 |
| 5,803,686 | A * | 9/1998 | Erbes et al. | 411/55 |
| 8,057,145 | B2 * | 11/2011 | Dolan et al. | 411/57.1 |
| 8,226,320 | B2 * | 7/2012 | Steinke | 403/371 |
| 8,496,394 | B2 * | 7/2013 | Schneider | 403/370 |
| 2003/0108398 | A1 * | 6/2003 | Sathianathan | 411/60.1 |

FOREIGN PATENT DOCUMENTS

DE    10 2005 008497 A1    8/2006

OTHER PUBLICATIONS

WIPO; International Search Report for PCT/FR2010/051126; Oct. 1, 201; 2 pages.

* cited by examiner

*Primary Examiner* — Daniel Wiley
(74) *Attorney, Agent, or Firm* — Henricks, Slavin & Holmes, LLC

(57) ABSTRACT

A family of devices attach elements previously bored in a cylindrical manner, wherein each device has a in extending along an axis and a tapered shaft and a head, and a bushing intended for accommodating the shaft of the pin, the bushing extending along the same axis having an outer cylindrical surface and an inner tapered surface. The family has at least two devices with bushings presenting, before installation by interference, an identical outer diameter and a different rate of taper of the inner surface.

14 Claims, 2 Drawing Sheets

FAMILY OF FIXATION DEVICES WITH VARIABLE TAPER

CROSS REFERENCE TO RELATED APPLICATIONS

This application is a National Stage of International Application No. PCT/FR2010/051126, filed Jun. 8, 2010, which claims priority to application FR0953959 filed Jun. 13, 2009.

This invention relates to a family of attachment devices with variable taper. The technical field of the invention relates, in a general manner, to that of pins and bushings. More particularly, the invention relates to pins and bushings intended for assembling structural elements of an aircraft previously bored in a cylindrical manner.

In the prior art, in order to install attachment devices within such structural elements, cylindrical and/or tapered pins are known, made out of metallic material and covered with a coating promoting their capacity of sliding within a bore made in the elements being assembled.

In the prior art, documents U.S. Pat. No. 4,048,898, U.S. Pat. No. 4,702,658 and U.S. Pat. No. 3,270,410 are also known, which respectively describe a tapered device for attaching metallic multi-layer elements, a device for reducing the forces and installation costs of a tapered attachment device and a method for pre-stressing a piece of equipment. Attachments with conical shafts are normally used by aircraft manufacturers in assembly areas with difficult access and requiring installation by interference. Interference is defined by installing a pin with a body whose outer diameter is larger than the diameter of the bore into which it is inserted, which causes the bore to expand during installation of the pin. For metallic materials, the installation of pins by interference is performed simply by pulling or pushing them into the bore which, due to the optimised design of the mouth radius of the shaft of the pin and a coating with a low friction coefficient, does not cause the structure to become damaged. For metallic materials, installation by interference increases the endurance life of the structure.

The new generation of aircraft uses a structure made out of composite materials, which has the advantage of lightening the aircraft in a significant manner, and which is not sensitive to fatigue phenomena, however, contrary to a metallic structure, has the disadvantage of poor conductivity and causes problems regarding resistance to lightning impacts. In order to be resistant to lightning, any clearance existing between the attachment and the bore thus requiring installation by interference into the composite materials must also be corrected.

Installation by interference of an attachment into a structure made out of composite materials presents significant delamination risks regarding the latter due to the friction of the body of the attachment against the bore made within the composite structure, which can lead to damage by delamination and therefore to reduced resistance.

Thus, the use of a bushing covering the body of the attachment, initially installed with clearance in the structure, becomes necessary in order to protect the composite material from any delamination. Secondly, the radial expansion of this bushing is required in order to remove this clearance for the reasons previously stipulated.

For attachments with conical shafts, the creation of conical bores within aircraft structures presents some difficulties and causes one of ordinary skill in the art to use a pin with a conical shaft jacketed with a cylindro-conical bushing, for example made out of stainless steel. This device is then installed in the cylindrical bore of the structure in order to prevent the need for machining the conical bore.

The prior art, based on the U.S. Pat. No. 4,048,898 uses a bushing that is both cylindrical on the outside and conical within, which accommodates a pin with a conical shaft. According to the thicknesses of the elements being assembled, the body increases in length, but also in diameter.

Therefore, in the prior art, there are as many references for attachment devices as there are different thicknesses of elements being assembled. In other words, the thicker the elements being assembled, the larger the diameter of the bore of said elements and the larger the diameter of the bushing. This large variety constitutes a major technical problem for one of ordinary skill in the art. Indeed, he/she must provide for the appropriate tool and device for each thickness of the element being attached, which represents significant costs in tooling, in addition to a loss of the time required to change the tooling. Moreover, the notion of having a variety of bore sizes prevents the structural strength of the elements assembled from being predicted in a simple and robust manner.

One of ordinary skill in the art has resolved this problem by creating families of different drills and lengths, varying per diameter of the attachment, and has thus reduced the number of tools required, however has not arrived at requiring a single tool for any length being fastened as exists for attachments with cylindrical bodies.

In order to resolve this problem, the invention relates to the idea of adapting the rate of taper of the device according to its height. The rate of taper relates to the ratio, expressed as a percentage, of the difference between the largest diameter and the smallest diameter of the frustum divided by its height. The rate of taper is therefore defined by the following formula:

$$C=(D-d)/H$$

The invention can also relate to applications within mixed structures, i.e. using both composite and metallic materials, for example aluminium or titanium-type alloys, where the device would be installed in a succession of metallic/composite layers forming the structure of the aircraft; or for example, within purely metallic structures, for example made out of aluminium or titanium. In this example, no delamination risks exist, however the interest of using the invention shall reside in the advantage of eliminating conical bores.

The rate of taper of the bushings according to the invention is comprised between several tenths of a percent and 10%. Thus, with three or four clearances of devices with the same outer diameter, however with different rates of taper, all of the thickness configurations encountered in structural assemblies can be fastened, typically ranging from once to ten times the diameter of the device and without modifying the bore made within the elements being assembled.

The invention therefore relates to a family of devices for attaching elements previously bored in a cylindrical manner, each device comprising
  a pin extending along an axis and comprising a tapered shaft and a head,
  a bushing intended for accommodating the shaft of the pin in its enclosure, the bushing extending along the same axis having an outer cylindrical surface and an inner tapered surface,
  characterised in that
  it comprises at least two devices with bushings presenting, before installation by interference, an identical outer diameter and a different rate of taper of the inner surface.

BRIEF DESCRIPTION OF THE DRAWINGS

The invention and its different applications will be better understood after reading the following description and after examining the accompanying figures. These are presented as a rough guide and in no way as a limited guide to the invention. The figures show.

In these figures, the identical elements preserve the same reference numbers.

DETAILED DESCRIPTION

Figures 1A, 1B:
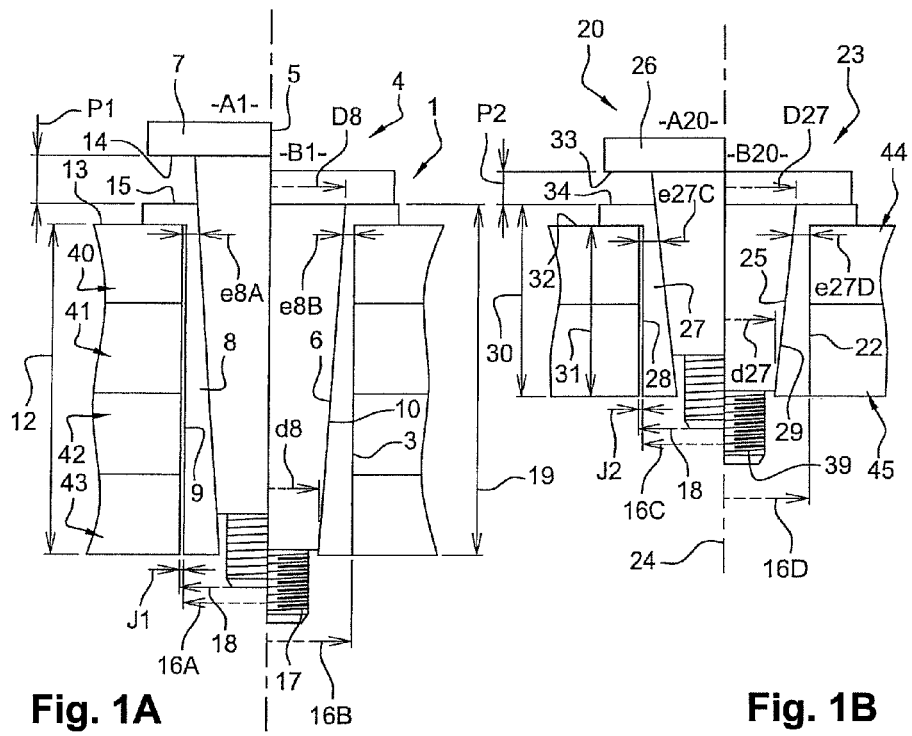
FIG. 1A: a schematic representation of a cross-section of a first member of a first example of a family of attachment devices according to the invention.
FIG. 1B: a schematic representation of a cross-section of a second member of a first example of a family of attachment devices according to the invention.

FIGS. 1A and 1B represent, in a schematic manner, a cross-section of a first example of a family of devices for attaching elements according to the invention. In one example, the elements being assembled constitute an aircraft structure and the family comprises two attachment devices 1 and 20.

Device 1 is represented, from the left-hand side A1 of its axis of symmetry 5 crossing through its middle, before installation by interference, i.e. at the very beginning of the installation, when the latter has been inserted without stress, with clearance and without radial expansion, within the aircraft structure. The device is represented after installation by interference by radial expansion within the structure, from the right-hand side B1 of axis 5, the cross-section being defined by this axis 5.

Device 20 is represented before installation by interference, from the left-hand side A20 of its axis of symmetry 24 crossing through its middle. The device is represented after installation by interference, from the right-hand side B20 of axis 24, the cross-section being defined by this axis 24.

Attachment device 1 is intended for assembling four structural elements 40, 41, 42 and 43, previously bored 3 in a cylindrical manner, with a diameter 18. In a first example, the elements 40, 41, 42 and 43 being assembled have an overall thickness given the reference number 12. Device 1 comprises a pin 4 extending along axis 5. Pin 4 comprises a tapered shaft 6 extending on one side into a flat cylindrical head 7, and on the other side into a thread 17. The head 7 forms a disc with a plane perpendicular to axis 5, the disc intended to be positioned in a manner substantially parallel to an upper surface 13 of the element.

Device 1 also comprises a bushing 8 intended for accommodating the tapered shaft 6 of the pin 4 in its enclosure. Bushing 8 extends along the same axis 5 and has an outer cylindrical surface 9 and an inner tapered surface 10.

Before installation by interference, a distance, referred to as protrusion P1, separates a lower surface 14 of the head 7 of the pin 4 and an upper surface 15 of the bushing 8.

In order to make the introduction of device 1 into the cylindrical bore 3 possible, an initial assembly clearance J1 is required between an outer diameter 16A of the bushing 8 before installation by interference and the bore diameter 18 of elements 40, 41, 42 and 43. In the example of high-precision assembly, the initial clearance and expansion are controlled by factory pre-machining the outer diameter with a level of precision of approximately several tenths of microns and of the bushing, with its pin pre-fitted to the protrusion P1, itself also factory-controlled.

Attachment device 20 is intended for assembling two structural elements 44 and 45, previously bored 22 in a cylindrical manner, with the same diameter 18. In this second example, the elements being assembled comprise two layers 44 and 45 and have an overall thickness given the reference number 31. Device 20 comprises a pin 23 extending along axis 24. Pin 23 comprises a tapered shaft 25 extending on one side into a flat cylindrical head 26, and on the other side into a thread 39. The head 26 forms a disc with a plane perpendicular to axis 24, the disc intended to be positioned in a manner substantially parallel to an upper surface 32 of the element 44.

Device 20 also comprises a bushing 27 intended for accommodating the tapered shaft 25 of the pin 23. Bushing 27 extends along the same axis 24 and has an outer cylindrical surface 28 and an inner tapered surface 29.

Before installation by interference, a protrusion P2, separates a lower surface 33 of the head 26 of the pin 23 and an upper surface 34 of the bushing 27.

In order to make the introduction of device 20 into the cylindrical bore 22 possible, an initial assembly clearance J2 is required between an outer diameter 16C of the bushing 27 before installation by interference and the bore diameter 18 of elements 44 and 45.

In order to assemble elements 40, 41, 42 and 43 on the one hand, and 44 and 45 on the other hand, pins 4 and 23 are inserted by pulling motion using a nut tightened around the thread 17 or by using a traction mandrel or by pushing motion on the head. Thus, interference is created between the pin, the bushing and the element being assembled throughout the entire thickness. This interference corresponds to a difference IF1 and IF2 between a diameter 18 of the bore and an outer diameter 16B and 16D of the bushing after installation by interference. The interference is chosen and predetermined so as to at least compensate for the initial amount of clearance, i.e. to fill the empty space by exerting a radial pressure on the element being assembled, and thus to radially pre-stress the assembly.

Due to the preservation of volumes, a reduction in thickness $\Delta 1$ and $\Delta 2$ of the bushing occurs during the installation by interference. Indeed, at the upper end of bushings 8 and 27, the thicknesses e8A and e27C, before installation by interference, are larger than the thicknesses, after installation by interference, e8B and e27D respectively. For simplification purposes, the variation in thickness is considered to be the same over the entire length of the bushing.

The two devices 1 and 20 therefore comprise bushings 8 and 27 with, before installation by interference, an identical outer diameter 16A and 16C and a different rate of taper C1 and C2 of the inner surface. More precisely, the rate of taper formed by the axis 5 and 24 and the tapered surface 10 and 29 of bushings 8 and 27 respectively, varies conversely with the height 19 and 30 of bushings 8 and 27 respectively.

Typically, the rate of taper falls between several tenths of a percent and 10%, preferably between 1% and 4%. In the preferred mode of embodiment, the rate of taper of shaft 6 and 25 of pin 4 and 23 is the same as that of the inner surface 10 and 29 of bushing 8 and 27 respectively. In one alternative, the rate of taper of shaft 6 and 25 of pin 4 and 23 can be substantially different from the inner surface 10 and 29 of bushing 8 and 27 in order to generate a variable rate of interference, in a controlled manner, along the thickness. In another alternative, the rate of taper can vary locally within the same sub-family in such a way as to adjust the interference in a defined area.

The rate of taper varies according to the interface IF, the protrusion P, the reduction in thickness Δ and the clearance J, according to the following formula:

$$C=(IF+J+\Delta)/P.$$

According to the invention, height 19 and 30 of bushings 8 and 27 corresponds, at least, to once their outer diameter after installation by interference 16B and 16D and, at most, ten times this diameter. A rate of interference defined by the interference value chosen in relation to the outer diameter of the bushing before installation by interference, varies between 0 and 3%.

To summarise:
IF1=16B−18 and IF2=16D−18;
J1=18−16A and J2=18−16C;
Δ1=2(e8A−e8B) and Δ2=2(e27C−e27D).
In a numbered example, where J=0.05 mm; Δ=0.1 mm; IF=0.05 mm; and P=10 mm; this becomes:

$$C=(0.05+0.05+0.1)/10=0.2/10=2\%.$$

The rate of taper of bushing 8 is in this example equal to the ratio, expressed as a percentage, of the difference between its largest diameter D8 and its smallest diameter d8 of its inner tapered surface 10 divided by its height 19. In other words, C8=(D8−d8)/19.

The rate of taper of bushing 27 is in this example equal to the ratio, expressed as a percentage, of the difference between its largest diameter D27 and its smallest diameter d27 of its inner tapered surface 29 divided by its height 30. In other words, C27=(D27−d27)/30.

Figure 2:
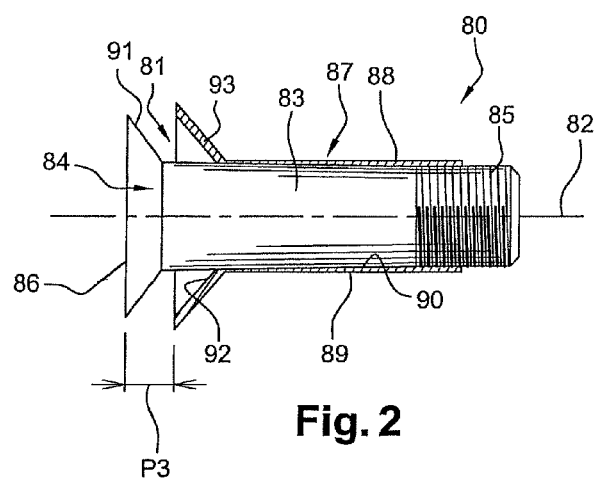
FIG. 2: a schematic representation of a cross-section of another example of an attachment device according to the invention.

FIG. 2 represents, in a schematic manner, a cross-section of another example of an attachment device 80 according to the invention. This is a countersunk head device. Device 80 comprises a pin 81 extending along an axis 82. Pin 81 comprises a tapered shaft 83 extending on one side into a countersunk head 84, and on the other side into a thread 85. The upper end 86 of the countersunk head 84 forms a disc with a plane perpendicular to axis 82, the disc intended to be positioned in a manner substantially parallel to an upper surface of the elements being assembled.

Device 80 also comprises a bushing 87 suitable for and intended for pin 81. Bushing 87 comprises a cylindro-conical shaft 88 capable of accommodating the tapered shaft 83 of pin 81 and a tapered part 93 capable of accommodating the countersunk head 84. Bushing 87 extends along the same axis 82 and has an outer cylindrical surface 89 and an inner tapered surface 90.

Before installation by interference, a distance, referred to as protrusion P3, separates a lower surface 91 of the head 84 of the pin 81 and an upper surface 92 of the bushing 87.

Figure 3:
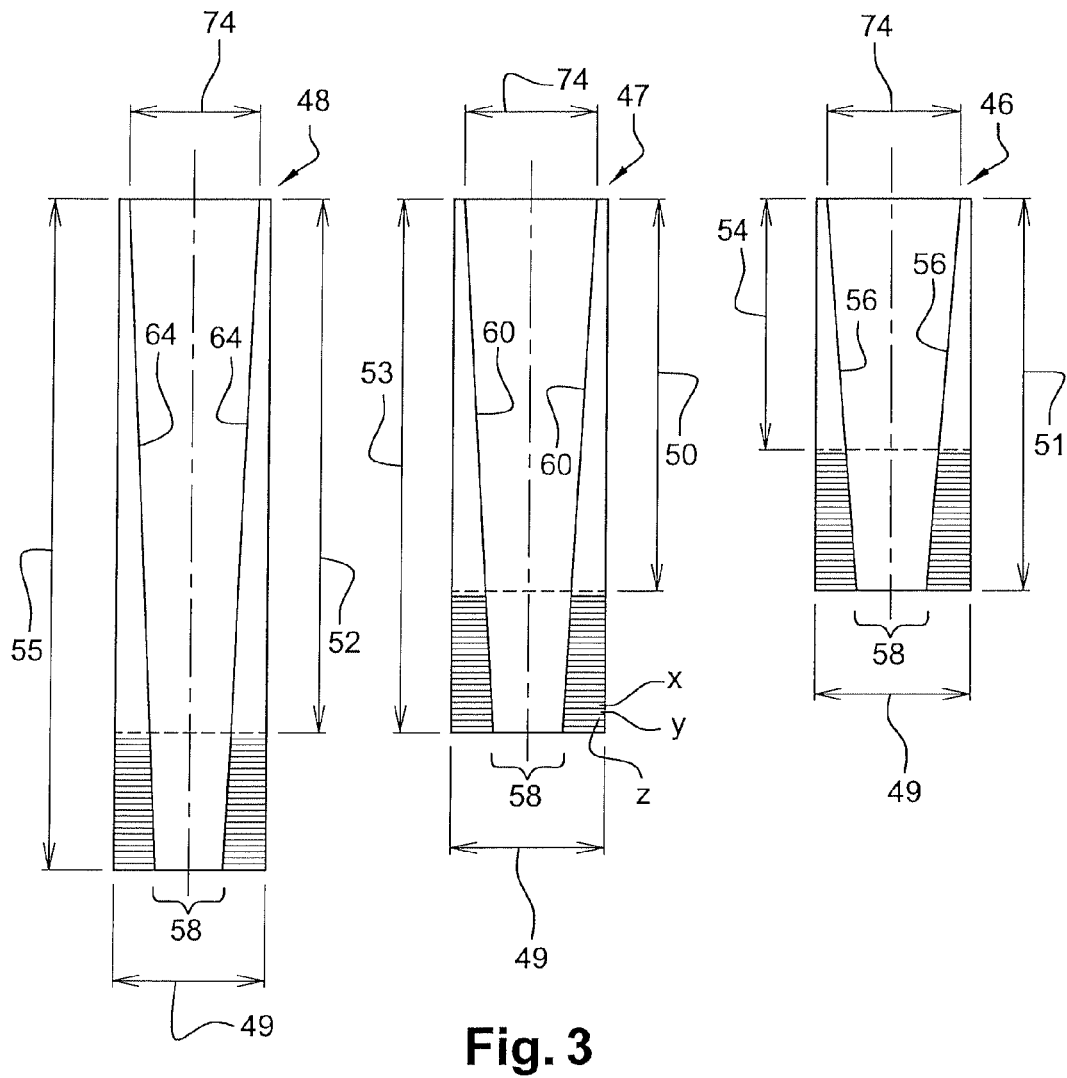
FIG. 3: a schematic representation of a cross-section of the bushings of a second example of a family of attachment devices according to the invention.

FIG. 3 represents, in a schematic manner, a cross-section of the bushings of a family of attachment devices according to the invention.

According to the invention, the family of devices, for a given diameter, is constituted from N number of subfamilies, each subfamily comprising several devices with different heights and identical rates of taper.

In this example, the family comprises, for a diameter 49, three subfamilies 46, 47 and 48 with rates of taper of 1%, 2.5% and 4% respectively, and with an identical outer diameter 49.

According to the invention, in a general manner, for a subfamily N, the minimum height of a bushing is equal to the maximum height of a bushing of subfamily N−1 in such a way as to create continuity over the entire range of thicknesses to be fastened.

In this example, the minimum height 50 of the bushing of subfamily 47 is equal to the maximum height 51 of the bushing of subfamily 46 and the minimum height 52 of the bushing of subfamily 48 is equal to the maximum height 53 of the bushing of subfamily 47.

The height of the bushings evolves by intervals of one sixteenth of an inch, i.e. by 1.5875 millimeters. In FIG. 3, a multitude of horizontal, solid, parallel lines represents the heights of the bushings each separated by one sixteenth of an inch in each of the subfamilies 46, 47 and 48.

In a numbered example, the minimum outer diameter of a bushing is 15.04 mm, with a height of between once this diameter, i.e. 15.04 mm and ten times this diameter, i.e. 150.4 mm.

In the example in FIG. 3, the minimum height 54 of the bushing of subfamily 46 measures one and a half times its outer diameter, i.e. 1.5×35 mm=52 mm and the maximum height 55 of the bushing of subfamily 48 measures approximately four times its outer diameter=142 mm. In other words, the family according to the invention comprising three subfamilies 46, 47 and 48 enables elements to be fastened that have been bored with a diameter measuring very slightly more than 35 mm, and whose thickness falls between 52 millimeters and 142 millimeters.

According to the invention, diameters 49 and 74 respectively are identical for all of the devices of the three subfamilies 46, 47 and 48, whatever their height.

In this example, the smallest diameter 58 of the inner surface is identical for each of the highest devices from the three subfamilies 46, 47 and 48.

In one variation, within one family, the diameter 58 is different for each of the highest devices of a subfamily.

In subfamily 46, the solid oblique lines 56 correspond to the tapered inner surface of the bushing with the largest height 51. The smallest inner diameter 58 of the largest bushing is projected along this frustum 56 and thus varies according to the height of the bushing. Therefore, all of the bushings of subfamily 46 have an identical rate of taper.

The rate of taper of the bushings of subfamily 46 is, for example, equal to the ratio, expressed as a percentage, of the difference between the largest diameter 74 and the smallest diameter 58 of its inner tapered surface 56 divided by its height 51.

In subfamily 47, the solid oblique lines 60 correspond to the tapered inner surface of the bushing with the largest height 53. The smallest inner diameter 58 of the largest bushing is projected along this frustum 60 and thus varies according to the height of the bushing. Therefore, all of the bushings of subfamily 47 have an identical rate of taper.

The rate of taper of the bushings of subfamily 47 is, for example, equal to the ratio, expressed as a percentage, of the difference between the largest diameter 74 and the smallest diameter 58 of its inner tapered surface 60 divided by its height 53.

Subfamily 47 comprises in particular three bushings X, Y and Z with different heights. Each height being separated by one sixteenth of an inch.

In subfamily 48, the solid oblique lines 64 correspond to the tapered inner surface of the bushing with the largest height 55. The smallest inner diameter 58 of the largest bushing is projected along this frustum 64 and thus varies according to the height of the bushing. Therefore, all of the bushings of subfamily 48 have an identical rate of taper.

The rate of taper of the bushings of subfamily 48 is, for example, equal to the ratio, expressed as a percentage, of the difference between the largest diameter 74 and the smallest diameter 58 of its inner tapered surface 64 divided by its height 55.

Figure 4:
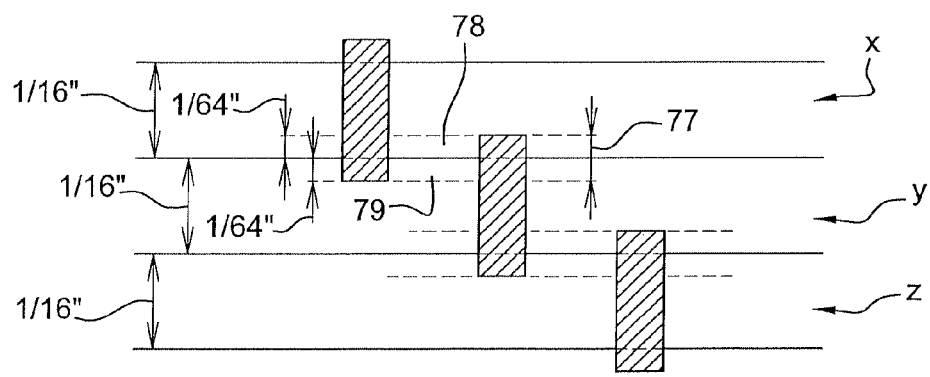
FIG. 4: a schematic representation of a close-up image of the grip ranges.

FIG. 4 represents, in a schematic manner, a close-up image of the acceptable grip ranges for devices X, Y and Z. The grip range is the difference between the maximum and minimum thicknesses of the structure that may be assembled with a device. An overlap range 77 enables the bushing X or Y to be used indifferently for fastening the same thickness of element falling within this range. In this example, the overlap range 77 corresponds to a double margin 78 and 79 of one sixteenth of an inch each.

This overlap range 77 of one thirty-second of an inch enables a structure, with a thickness falling within this overlap range, to be assembled using either bushing X or Y. This becomes particularly interesting when the thickness being fastened is located near to the end of the grip range of X or at the very beginning of the grip range of Y, and that an uncertainty exists between the choice of X or Y. This overlap range 77 can also compensate for the compaction effect on the structure during assembly.

The invention claimed is:

1. A family of at least two subfamilies of devices for attaching a number of elements having cylindrical bores therethrough with the same diameter, each device of each subfamily comprising:
   a pin extending along an axis and comprising a tapered shaft and a head,
   a bushing accommodating the shaft of the pin, the bushing extending along the same axis and having an outer cylindrical surface having an outer diameter and an inner tapered surface, wherein
   said at least two subfamilies of devices comprise bushings comprising, before installation by interference, identical outer diameters, and wherein the inner tapered surface of the bushing from one subfamily has a rate of taper different from the rate of taper of the bushing from another of the at least two subfamilies.

2. A family according to claim 1, wherein the rate of taper is equal to the ratio of the difference between a largest diameter and a smallest diameter of the inner tapered surface, divided by a bushing height.

3. A family according to claim 1, wherein the rate of taper falls between 1% and 10%.

4. A family according to claim 3, wherein the rate of taper falls between 1% and 4%.

5. A family according to claim 1 or 2, wherein the height of the bushing corresponds, at least, to the outer diameter after installation by interference and, at most, ten times the outer diameter after installation by interference.

6. A family according to claim 1 or 2, wherein a rate of taper of the shaft of the pin is the same as the rate of taper of the inner tapered surface of the bushing.

7. A family according to claim 1 or 2, wherein a rate of taper of the shaft of the pin is different to the rate of taper of the inner tapered surface of the bushing.

8. A family according to claim 1 or 2, wherein each said subfamily comprises at least two devices with different bushing heights varying between a minimum height and a maximum height, and identical bushing rates of taper.

9. A family according to claim 8, wherein the heights of the bushings of the at least two devices with different bushing heights vary between a minimum height and a maximum height with a step of one sixteenth of an inch.

10. A family according to claim 8, wherein a bushing minimum height of one subfamily is equal to a maximum height of a bushing of another subfamily.

11. A family according to claim 1 or 2 wherein the family comprises at least three subfamilies, a first subfamily having a bushing rate of taper equal to 1%, a second subfamily having a bushing rate of taper of 2.5% and a third subfamily having a bushing rate of taper of 4%.

12. A family according to claim 1 or 2, wherein the pin head is cylindrical or countersunk in shape and the associated bushing is suitable for accommodating this pin with a cylindrical or countersunk head.

13. Structure comprising at least two elements having a first thickness with a first cylindrical bore and at least two elements having a second thickness with a second cylindrical bore, the first thickness being greater than the second thickness, wherein first and second cylindrical bores have, before installation by interference, the same diameters, said structure further comprising a first device from one subfamily of a family according to claim 1 or 2 installed in interference in the first cylindrical bore, and a second device from another subfamily of a family according to claim 1 or 2 installed in interference in the second cylindrical bore.

14. Structure according to claim 13 wherein, before installation in interference of first and second devices, first and second cylindrical bores are such as a clearance exists between the outer diameter of the bushing of said first and second device intended to be installed in said first and second cylindrical bores, and the cylindrical bore diameter.

* * * * *